United States Patent [19]

Emmrich et al.

[11] Patent Number: 4,997,547

[45] Date of Patent: Mar. 5, 1991

[54] METHOD FOR THE PRODUCTION OF AN AROMATE CONCENTRATE SUITABLE FOR USE AS BLENDING COMPONENT FOR FUEL

[75] Inventors: Gerd Emmrich; Bernhard Firnhaber, both of Essen; Martin Schulze, Velbert, all of Fed. Rep. of Germany

[73] Assignee: Krupp Koppers GmbH, Essen, Fed. Rep. of Germany

[21] Appl. No.: 316,911

[22] Filed: Feb. 21, 1989

[30] Foreign Application Priority Data

Feb. 20, 1988 [DE] Fed. Rep. of Germany ....... 3805383

[51] Int. Cl.$^5$ .................. C10G 21/20; C10G 21/28
[52] U.S. Cl. ................... 208/313; 208/321; 208/326; 585/804; 585/807; 585/808; 585/835; 585/860; 585/863; 203/43; 203/45; 203/46; 203/58
[58] Field of Search ............ 208/313, 321, 326; 585/804, 807, 808, 835, 860, 863; 203/43, 45, 46, 58

[56] References Cited

U.S. PATENT DOCUMENTS

| | | | |
|---|---|---|---|
| 3,944,483 | 3/1976 | Schwall et al. | 585/863 |
| 4,586,986 | 5/1986 | Preusser et al. | 585/808 |
| 4,664,783 | 5/1987 | Preusser et al. | 585/804 |
| 4,776,927 | 10/1988 | Emmrich et al. | 585/860 |
| 4,897,182 | 1/1990 | Maier et al. | 208/321 |

Primary Examiner—Anthony McFarlane
Assistant Examiner—Nhat Phan
Attorney, Agent, or Firm—Michael J. Striker

[57] ABSTRACT

In the method for the production of an aromate concentrate suitable for use as blending component for gasifier fuel, feed hydrocarbon mixtures having boiling ranges substantially between 40° and 170° C., are subjected, without any previous separation into individual fractions, to an extractive distillation employing N-substituted morpholine, substituents of which display no more than seven C-atoms, as selective solvent. Herewith, the lower boiling non-aromates with a boiling range up to about 105° C., practically completely, and most of the higher boiling non-aromates with a boiling range between about 105° and 160° C., are recovered as raffinate, whereas the aromates, which are to be employed in whole or in part as blending component, come down in the extract of the extractive distillation. In order to separate heavy aromates from solvent, a partial stream of the circulating solvent is mixed with water, and the heavy aromates are separated as a light phase from the solvent-water mixture. The solvent-water mixture is then separated into its components, which are re-utilized.

7 Claims, 2 Drawing Sheets

METHOD FOR THE PRODUCTION OF AN AROMATE CONCENTRATE SUITABLE FOR USE AS BLENDING COMPONENT FOR FUEL

BACKGROUND OF THE INVENTION

The invention concerns a method for the production of an aromate concentrate suitable for use as blending component for fuel, from feed hydrocarbon mixtures displaying boiling range substantially between 40 and 170° C and containing several aromates in addition to non-aromates. The feed hydrocarbon mixture, without previous separation into individual fractions, is subjected to an extractive distillation with the use of N-substituted morpholine, the substituents of which display no more than seven C-atoms, as selective solvent, with substantially all of the low-boiling non-aromates having a boiling range up to about 105° C. and a majority of the higher-boiling non-aromates having a boiling range between about 105° and 160° C. being distilled off as raffinate from the top of the extractive distillation column, whereas the main amount of the aromates, as well as the residual non-aromates, together with the employed solvent, being discharged as extract from the sump of the extractive distillation column, whereupon the hydrocarbons in the extract are distillatively separated from the solvent in a subsequently disposed solvent separation column and employed in whole or in part as blending component, while the solvent is returned to the extractive distillation column.

A method of this general type is known from German Offenlegungsschrift DE-OS 36 12 384, employing aromate-containing hydrocarbon mixtures as feed hydrocarbon mixtures. Particularly suitable for this purpose are reformate and platformate with not too high a content of benzene, from the working up of petroleum. However, mixtures of such reformate and platformate with pyrolysis benzene can also be employed.

With these entry products, the boiling limit indeed normally lies at 170° C. However, it has turned out in practice that this boiling limit is not maintained in many cases, since the initial production processes result in a formation of condensation and polymerization products which display a higher boiling point than 170° C., and which correspondingly contaminate the reformate and platformate. Thus, for example, a typical reformate from the working-up of petroleum displays a portion of higher-boiling components with a boiling point greater than 170° C., to an extent of about 3% by weight. The composition of this higher boiling fraction is as follows:

| Compound | KP°C. | % by weight |
|---|---|---|
| m-cymol | 175 | 3.4 |
| hemmellitol | 176.1 | 14.3 |
| p-cymol | 177.1 | 12.3 |
| N-butylbenzene | 183 | 2.8 |
| indane | 177.8 | 9.9 |
| 1,2-diethylbenzene | 183.4 | 24.3 |
| durene | 196.8 | 4.7 |
| I-durene | 198 | 16.2 |
| tetralin | 207.6 | 0.1 |
| trimethylethylbenzene | 213 | 3.0 |
| naphthalene | 218 | 4.0 |
| methyltetralin | 229 | 0.1 |
| $\beta$-methylnaphthalene | 241 | 2.0 |
| $\alpha$-methylnaphthalene | 245 | 1.2 |
| diphenyl | 255 | 0.8 |
| dimethylnaphthalene | 268 | 0.9 |
| TOTAL = | | 100.0 |

Since the portion of these higher-boiling condensation and polymerization products, which shall be designated hereafter as heavy aromates, can amount in individual cases to substantially more than 3% by weight in the reformate and platformate, there can result difficulties during the performance of the method according to DE-OS 36 12 384.

It has been proven in practice that these heavy aromates become concentrated in the selective solvent. With progressive operational periods, this leads to ever stronger contamination of the solvent led in circulation, so that its selectivity is steadily decreased and the separation effect in the extractive distillation is correspondingly diminished. Attempts to separate out the heavy aromates by distillation of the solvent have provided no satisfactory results, even with high distillation expenditures, since part of the heavy aromate fraction boils in the same temperature range as the solvent. Inasmuch as a distillative separation is practically impossible, this problem could only be solved previously by providing a complete exchange of fresh solvent for the contaminated solvent after a certain operational period. Obviously, this technique is extremely costly, and thereby not economical. In addition, destruction of the contaminated solvent results in further cost, since it cannot be introduced to any other use or purpose.

SUMMARY OF THE INVENTION

It is therefore an object according to the present invention to so improve the above-described methods, as to avoid these mentioned difficulties.

This object is attained according to the present invention by cooling a partial stream of the solvent discharged from the solvent separation column to a temperature between 40° and 80° C. and then adding water in an amount of 5 to 20 parts by volume per 100 parts by volume of solvent, whereupon this mixture is led into a phase separator, in which the heavy aromates contained in the solvent are separated from the solvent-water mixture as the light phase, and then the solvent-water mixture discharged from the phase separator is split up into its components, which are re-employed in the method.

The method according to the present invention is therefore based upon recognition of the fact that the heavy aromates and the solvent, particularly the N-formylmorpholine preferably employed in practice, display different solubility characteristics in water. Whereas the solvent, particularly N-formylmorpholine, is soluble without limit in water, the heavy aromates dissolve in water only in very small amounts. Since the heavy aromates display, moreover, a clear difference in density compared to the solvent-water mixture (0.86 kg/l compared to about 1.05 kg/l of solvent-water mixture, with use of N-formylmorpholine), it can without difficulty be separated from the solvent-water mixture as the light phase in a phase separator. The solvent-water mixture is discharged therewith from the phase separator as the heavy phase. It cannot, however without more be returned to the solvent circulation of the extractive distillation, since there still exists the danger of a hydrolytic decomposition of the solvent. Accordingly, it is initially necessary to divide the solvent-water mixture into its components, before they can be re-employed in the method.

Two method variations are provided according to the present invention for this division:

According to the first variation, the solvent-water mixture is introduced into the sump of the column which serves for recovery of solvent from the raffinate. Together with the hydrocarbons of the raffinate (non-aromates), the water is azeotropically distilled off at the top from the column and condensed together with the hydrocarbons of the raffinate, from which they can be separated in a so-called reflux container by means of phase separation. Subsequently, the water can be returned for re-employment in the method. The solvent, freed of water, remains in the sump of the column, and is excluded across a separating flask and returned to the method. Any entrained hydrocarbons of the raffinate are separated therewith in the separating flask and returned to the column. Such an azeotropic water separation offers the advantage that nearly all of the water is distilled off from the sump of the column, since the hydrocarbons of the raffinate (non-aromates) are present in great excess. If at all, only traces of water are still carried along in the solvent circulation. However, their concentration is in no case greater than the amount of water which can normally be contained in the feed hydrocarbon mixture. Accordingly, the danger of a hydrolysis of the solvent by means of such carried along water is not to be feared.

With the second variation, the separation of the solvent-water mixture occurs in a solvent regeneration column. Before its entry into this column, toluene and/or xylene is added to the solvent-water mixture. The water is then azeotropically distilled off with the added toluene and/or xylene in the column, and then separated from these aromates in a subsequently disposed separation arrangement by means of phase separation. In order to keep the water extensively solvent-free, reflux to the column must be relinquished.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
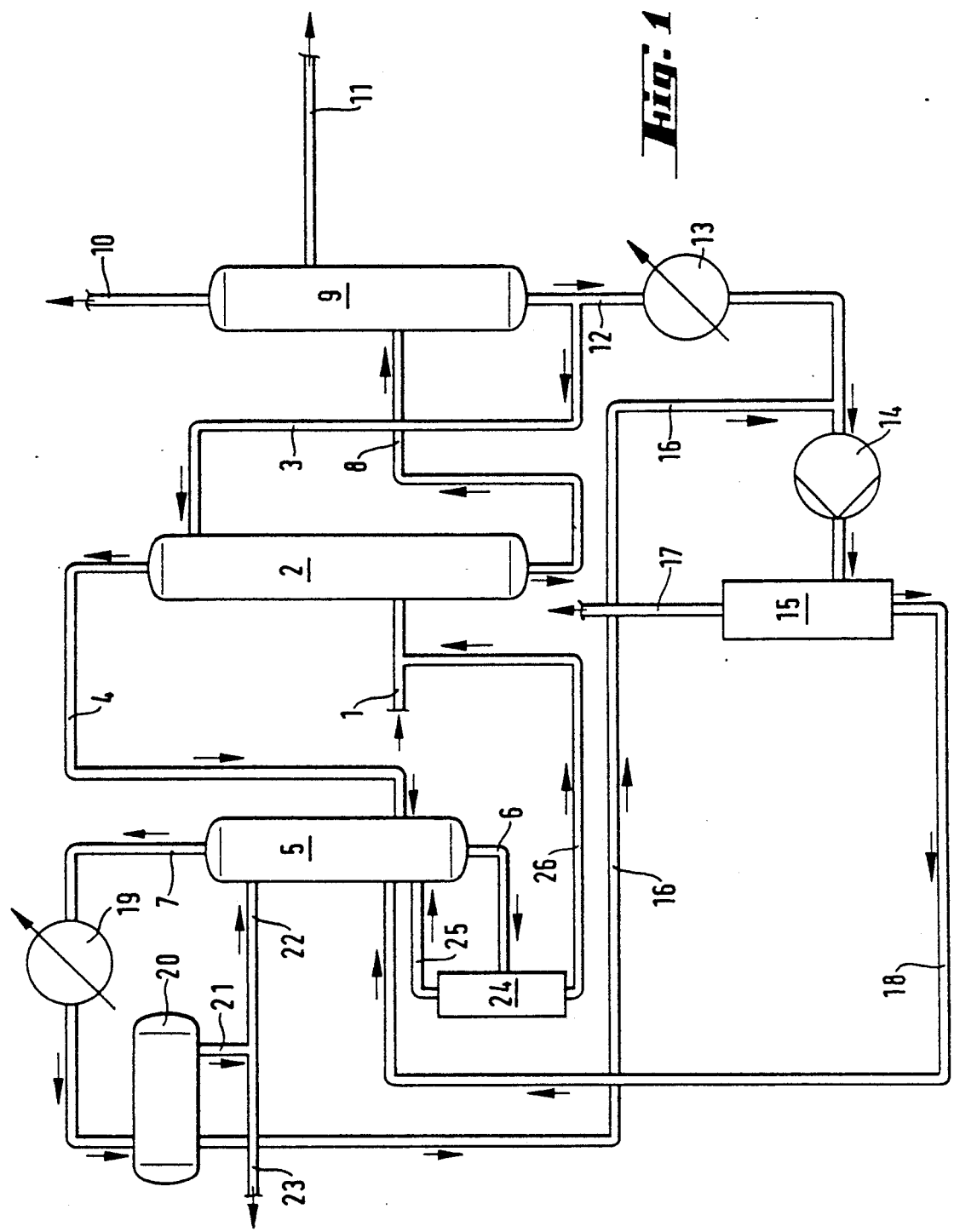
FIG. 1 is a schematic flow-chart representation of the method according to the present invention, in which the division of the solvent-water mixture follows in the column which serves for recovery of the solvent from the raffinate (first method variation).

In the method variation represented in the flow-chart of FIG. 1, the feed hydrocarbon mixture is introduced for working-up without any pre-fractionation, across conduit 1 into the middle part of extractive distillation column 2, which is provided with plates. The hydrocarbons of the raffinate escape across the top from the extractive distillation column 2, and are led across conduit 4 into column 5, in which the hydrocarbons of the raffinate (top-product) are distillatively separated from the solvent remainder. The latter are discharged across conduit 6, whereas the hydrocarbons of the raffinate, freed of solvent, escape across the top from column 5 and are discharged across conduit 7. The hydrocarbons of the extract (bottom product) are discharged together with the main amount of the solvent across conduit 8 from the sump of the extractive distillation column 2, and are led from there into the middle part of the solvent separation column 9, which can, if necessary, also be provided with plates. In this column, the hydrocarbons of the extract, composed mainly of aromates, are separated from the solvent, whereby the recovered solvent, which becomes concentrated in the sump of the driver column 9, is returned across conduit 3 to the extractive distillation column 2, and re-introduced therein at the top. The hydrocarbons of the extract, freed of solvent, are, in contrast, discharged from solvent separation column 9 across conduits 10 and 11 and then led to their further utilization. The following variations are possible:

1. The operational conditions in the extractive distillation column 2 are so adjusted that the benzene contained in the feed hydrocarbon mixture is extensively concentrated in the extract, the result being a benzene-poor raffinate. Then, in solvent separation column 9, the benzene contained in the extract is distillatively separated from the other aromates, and discharged as top product across conduit 10 as a salable pure benzene with a non-aromate content of less than 1000 ppm, whereas the aromate concentrate serving as blending component, which in this case is practically more or less benzene-free, is removed as a side stream across conduit 11 or across a side column, not shown in the drawing, at this place, from solvent separation column 9.

2. In this case, the operational conditions of the extractive distillation column 2 are so adjusted that a part of the benzene contained in the feed hydrocarbon mixture goes into the raffinate, and there remains in the aromate content of the extract only such a benzene content that does not exceed a desired maximal value lying below 5% by weight. With the working-up of the extract in the solvent separation column 9, the produced aroma concentrate serving as blending component is discharged exclusively across conduit 10, whereas the side escape across conduit 11 remains out of operation.

3. When on the one hand, the benzene content of the feed hydrocarbon mixture is relatively low, and, on the other hand, the concentration of this benzene content in the aromate concentrate serving as blending component is not considered to be troublesome, then the extractive distillation column 2 can be driven under such operational conditions that the entire amount of benzene can pass practically completely into the extract. In a departure from the method variation 1, however, no separation of the benzene from the other aromates occurs in the solvent separation column 9, in this case. That is, in this case the aromate concentrate is discharged in its entirety across conduit 10 from the solvent separation column 9, and the side drain over conduit 11 remains out of operation.

In order to avoid the above-described concentration of heavy aromates in the solvent, it is provided according to the present invention that a partial stream is branched off from the solvent which is returned across conduit 3 to the extractive distillation column. This partial stream, which lies within the order of magnitude of 1 to 5% by volume of the total amount of solvent led in circulation, travels across conduit 12 into the solvent cooler 13, and from there across mixing pump 14 into the phase separator 15. The water necessary for separation of the heavy aromatics is added to the partial stream of solvent before mixing pump 14 by means of conduit 16. This addition of water lies within the order of magnitude of 5 to 20 parts by volume per 100 parts by volume of solvent in conduit 12. In phase separator 15 the heavy aromatics are separated as a light phase from the solvent-water mixture, and discharged across conduit 17, whereas the solvent-water mixture which forms the heavy phase is removed across conduit 18 from the phase separator 15 and led into the sump of column 5. The water contained in the solvent-water mixture, together with the hydrocarbons of the raffinate, are azeotropically distilled off across the top from column 5. This hydrocarbon-water mixture is led across conduit 7 into the cooler 19, and then subsequently into the reflux container 20, in which the water is separated from the hydrocarbons of the raffinate by means of phase separation. Whereas the water is discharged across conduit 16 and added anew to the partial stream of solvent in conduit 12, the hydrocarbons from the raffinate are led initially into conduit 21, from which a small partial stream is discharged across conduit 22 and provided as reflux to column 5, while the main amount of hydrocarbons is removed across conduit 23 from the method, and introduced to its further utilization. Meanwhile, the solvent is introduced across conduit 6 into the separating flask 24, in which the carried-along hydrocarbons of the raffinate are separated by means of phase separation, and returned from there across conduit 25 into the sump of column 5. The solvent, freed of hydrocarbons, is meanwhile discharged across conduit 26 and added to the feed hydrocarbon mixture in conduit 1, together with which it is led into the extractive distillation column 2. Another possibility is to add this solvent, across conduit 26, to the solvent circulation in conduit 3.

Figure 2:
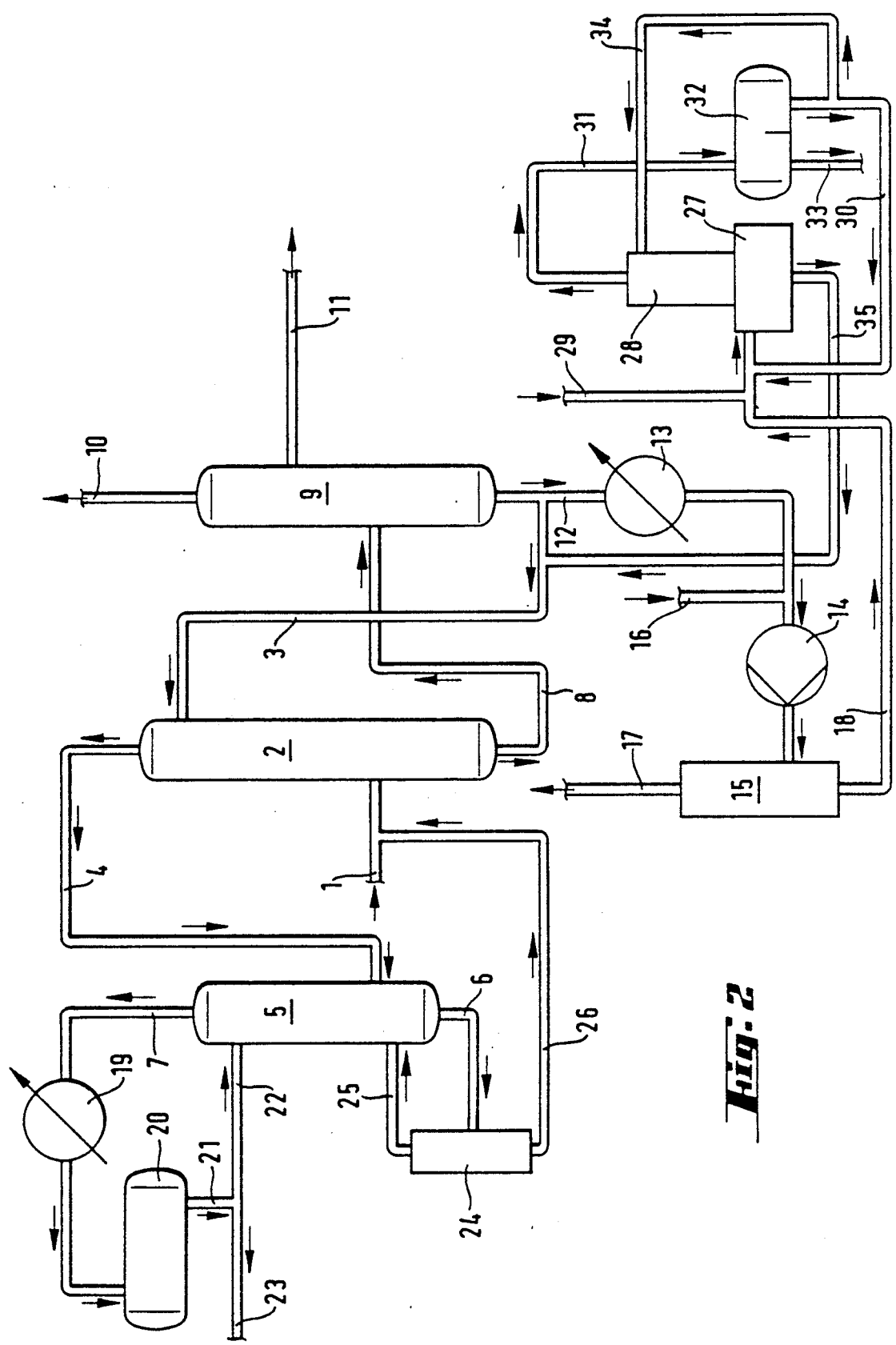
FIG. 2 is a schematic flow-chart representation of the method according to the present invention, in which the division of the solvent-water mixture follows in the solvent regeneration column (second method variation).

The method represented in the flow scheme according to FIG. 2 corresponds essentially with the method according to FIG. 1, with corresponding numerical designations obviously having the same meaning. In contrast to the method according to FIG. 1, however, the solvent-water mixture discharged here across conduit 18 from the phase separator 15 is introduced into the solvent regeneration column 27, which displays a reinforced distillation part 28. Before entry into this column, toluene and/or xylene is added to the solvent-water mixture across conduit 29 and/or conduit 30. The added amount of toluene and/ or xylene lies, according to the azeotrope ratio, within the range between 15 and 40 parts by volume per 100 parts by volume water in the solvent-water mixture. The water contained in the solvent-water mixture, together with the added aromatics (toluene and/or xylene), is azeotropically distilled off from the solvent regeneration column 27, and discharged across conduit 31. The water-free solvent is returned from the solvent regeneration column 27 sump across conduit 35 into the solvent circulation in conduit 3. In the reflux container 32, the driven-off water is separated from the aromatics by phase separation, and can be discharged across conduit 33. The water is led from there, although this is not represented in the flow scheme of FIG. 2, into conduit 16 for purposes of re-use. The aromatics are discharged across conduit 30 and led back to conduit 18, where they are added anew to the solvent-water mixture. However, a partial stream of the aromatics is discharged across conduit 34, which goes to the reinforced distillation part 28 of the solvent regeneration column 27, as reflux. To the extent that the amount of aromatics returned across conduit 30 is not sufficient, a corresponding supplementation must be supplied across conduit 29. Herewith, by appropriate operation of the extractive distillation column 2 and the solvent separation column 9, a partial stream of the toluene-xylene fraction discharged across conduit 11 can be employed. It is essential to point out that for the mentioned purpose, the xylene is preferred over the toluene, since xylene contains about 40% by weight water in the azeotrope, whereas toluene contains only about 13.5% by weight water in the azeotrope. In contrast, benzene, with only 9% by weight water in the azeotrope, is completely eliminated, since here consequently the necessary amounts of benzene for the water removal would be too great.

The flow schemes represented in the diagrams contain only those apparatus parts unconditionally necessary for illustration of the method according to the present invention. All additional arrangements not directly involved in the invention, are not represented. This applies in particular to the heat exchanger for heat exchange between the individual process streams, the circulation cooker for heating the individual columns, the arrangements for regeneration, respectively, replenishment of the consumed solvent, as well as all of the measuring and regulating arrangements.

The manner of operation of the method according to the present invention is finally proven by means of two operational examples. These operational examples refer only to the treatment according to the invention of the partial stream of solvent, whereas the associated recovery of the aromate concentrate suitable as blending component, which is indeed not the subject of the invention, is not more closely illustrated. It has been proven in practice during operation of a plant for the recovery of this aromate concentrate, that a heavy aromate content in the solvent within the order of magnitude of about 5% by weight in no way impairs the selectivity of the solvent It is first upon an increase in the content of heavy aromates to greater than or equal to 10% by weight, that there occurs a clear reduction in the selectivity of the solvent. It follows from this that in practice, the solvent can be circulated in the plant until a heavy aromate content of 10% by weight is reached. It is first then that a partial stream of the solvent must be discharged for the purpose of separation of heavy aromates, and treated according to the present invention. Based upon the above-mentioned experience in practice, it is sufficient when the heavy aromate content in this partial stream is lowered to a value of 5% by weight. Example 1 concerns herewith the first method variation, while Example 2 involves the second variation.

| EXAMPLE 1: | |
| --- | --- |
| Conduit 12 | 90 kg N-formylmorpholine |
| | 10 kg heavy aromates |
| Conduit 16 | 15 kg water |
| Conduit 17 | 5 kg heavy aromates |
| Conduit 18 | 90 kg N-formylmorpholine |
| | 15 kg water |
| | 5 kg heavy aromates |
| Conduit 7 | Non-aromates of the raffinate |

-continued

EXAMPLE 1:

| Conduit 26 | 15 kg water<br>90 kg N-formylmorpholine<br>5 kg heavy aromates |
|---|---|

EXAMPLE 2:

| Conduit 12 | 90 kg N-formylmorpholine |
| | 10 kg heavy aromates |
| Conduit 16 | 15 kg water |
| Conduit 17 | 5 kg heavy aromates |
| Conduit 18 | 90 kg N-formylmorpholine |
| | 15 kg water |
| | 5 kg heavy aromates |
| Conduits 29 and 30 | total 5 kg toluene-xylene mixture |
| Conduit 35 | 90 kg N-formylmorpholine |
| | 5 kg heavy aromates |
| Conduit 31 | 5 kg toluene-xylene mixture |
| | 15 kg water |

It will be understood that each of the elements described above, or two or more together, may also find a useful application in other types of production methods differing from the types described above.

While the invention has been illustrated and described as embodied in a method for the production of an aromate concentrate suitable for use as blending component for fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Method of producing an aromate concentrate suitable as blending component for fuel, from feed hydrocarbon mixtures having a boiling range substantially between 40° and 170° C. and containing several aromates in addition to non-aromates, comprising subjecting a feed hydrocarbon mixture, without previous separation into individual fractions, to an extractive distillation employing N-substituted morpholilne, substituents of which having no more than seven carbon atoms, as selective solvent, said extractive distillation being performed in an extractive distillation column having a top, discharging substantially all lower-boiling non-aromates having a boiling range up to about 105° C. and a majority of higher-boiling non-aromates having a boiling range between 105° and 160° C. as raffinate from the top of the extractive distillation column, distillatively separating hydrocarbons of an extract form said extractive distillation column from said solvent in a subsequently disposed solvent separation column, at least a portion of said hydrocarbons of said extract forming said blending component, returning said solvent separated in said solvent separation column to said extractive distillation column, cooling a partial stream of said solvent discharged form said solvent separation column to a temperature between 40° and 80° C., combining said partial stream of said solvent after said cooling with water in an amount from 5 to 20 parts by volume per 100 parts by volume solvent to form a solvent-water mixture, introducing the solvent-water mixture into a phase separator, separating heavy aromates contained in said solvent form said solvent-water mixture as a light phase, dividing the solvent-water mixture discharged from said phase separator into its components solvent and water and re-employing said solvent and water in said method.

2. The method according to claim 1, wherein said partial stream of said solvent subjected to heavy aromate separation is from about 1 to 5% by volume of said solvent circulated in said method.

3. The method according to claim 1, wherein said solvent comprises N-formylmorpholine.

4. The method according to claim 1, wherein said dividing of the solvent-water mixture discharged from said phase separator into its components solvent and water comprises the steps of introducing said discharged solvent-water mixture into another column having a top and a sump, said other column also serving for recovery of solvent from said raffinates, said solvent-water mixture being fed into said sump of said other column, distilling off water form said solvent-water mixture together with hydrocarbons from said raffinate from the top of said other column, separating said water from said hydrocarbons of said distilling off by means of phase separation, and discharging a water-free solvent form the sump of said other column.

5. The method according to claim 1, wherein said dividing of the solvent-water mixture discharged from said phase separator into its components solvent and water comprises adding a member selected from the group consisting of toluene, xylene and mixtures thereof to said solvent-water mixture in an amount from 15 to 40 parts by volume per 100 parts by volume water to form a resulting mixture, introducing the resulting mixture into a solvent regeneration column having a sump, azeotropically distilling off said water with said member in said solvent regeneration column, separating said water from said distilled off member by means of phase separation, and discharging a water-free solvent form the sump of said regeneration column.

6. The method according to claim 4, further comprising adding said water-free solvent to said free hydrocarbon mixture before entry thereof into said extractive distillation column.

7. The method according to claim 5, further comprising adding said water-free solvent into the solvent circulation.

* * * * *